(12) United States Patent
Odaka

(10) Patent No.: US 10,168,230 B2
(45) Date of Patent: Jan. 1, 2019

(54) TEMPERATURE DETECTION DEVICE, ELECTROPHOTOGRAPHIC TYPE IMAGE FORMING APPARATUS, AND TEMPERATURE DETECTION METHOD

(71) Applicant: KYOCERA Document Solutions Inc., Osaka-shi, Osaka (JP)

(72) Inventor: Yoshiyuki Odaka, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 135 days.

(21) Appl. No.: 15/497,012

(22) Filed: Apr. 25, 2017

(65) Prior Publication Data
US 2017/0314999 A1 Nov. 2, 2017

(30) Foreign Application Priority Data
Apr. 28, 2016 (JP) ................................. 2016-091140

(51) Int. Cl.
| | |
|---|---|
| *G01K 7/00* | (2006.01) |
| *G01K 1/00* | (2006.01) |
| *G01K 13/00* | (2006.01) |
| *G01K 7/02* | (2006.01) |
| *G01K 7/04* | (2006.01) |
| *G03G 15/20* | (2006.01) |
| *G01K 7/42* | (2006.01) |

(52) U.S. Cl.
CPC ............ *G01K 7/021* (2013.01); *G01K 7/02* (2013.01); *G01K 7/04* (2013.01); *G01K 7/42* (2013.01); *G03G 15/2003* (2013.01); *G03G 15/2039* (2013.01); *G01K 2207/00* (2013.01)

(58) Field of Classification Search
USPC .......................................... 374/179, 208, 141
See application file for complete search history.

(56) References Cited

U.S. PATENT DOCUMENTS

| | | | | |
|---|---|---|---|---|
| 5,299,870 A | * | 4/1994 | Moritani | G03G 15/2039 374/153 |
| 2003/0227533 A1 | * | 12/2003 | Yokoi | B41J 11/002 347/156 |
| 2014/0269836 A1 | * | 9/2014 | Kato | G01K 13/00 374/179 |

FOREIGN PATENT DOCUMENTS

JP 2004325637 A 11/2004

* cited by examiner

*Primary Examiner* — Mirellys Jagan
(74) *Attorney, Agent, or Firm* — Alleman Hall Creasman & Tuttle LLP

(57) ABSTRACT

A temperature detection device includes: a thermocouple configured to output a first signal value corresponding to a thermoelectromotive force generated between a hot junction and a cold junction thereof, a detection portion configured to output a second signal value corresponding to a temperature of the cold junction; a conversion processing portion; and a calculation processing portion, and detects a temperature of a fixing member by using a high-degree expression for temperature calculation that includes variables for which the first signal value and the second signal value are to be substituted.

5 Claims, 4 Drawing Sheets

| a | 104.56 |
|---|---|
| b | -1053.5 |
| c | 4228.4 |
| d | -8511 |
| e | 8791 |
| f | -3636.82 |
| g | -0.6 |
| h | 3 |
| i | 0.45 |
| β | 1.248 |

| VALUE BEFORE CONVERSION | | MULTIPLIER | VALUE AFTER CONVERSION | |
|---|---|---|---|---|
| $V_{to}$ | 1.19 | $2^{10}(1024)$ | $V_{to}'$ | 1218 |
| $V_{ta}$ | 1.28 | $2^{10}(1024)$ | $V_{ta}'$ | 1310 |
| a | 104.56 | $2^{10}(1024)$ | a' | 107069 |
| b | -1053.5 | $2^{7}(128)$ | b' | -134848 |
| c | 4228.4 | $2^{7}(128)$ | c' | 541235 |
| d | -8511 | $2^{7}(128)$ | d' | -1089408 |
| e | 8791 | $2^{7}(128)$ | e' | 1125248 |
| f | -3636.82 | $2^{7}(128)$ | f' | -465512 |
| g | -0.6 | $2^{7}(128)$ | g' | -76 |
| h | 3 | $2^{7}(128)$ | h' | 384 |
| i | 0.45 | $2^{7}(128)$ | i' | 57 |
| β | 1.248 | $2^{10}(1024)$ | β' | 1277 |

TEMPERATURE DETECTION DEVICE, ELECTROPHOTOGRAPHIC TYPE IMAGE FORMING APPARATUS, AND TEMPERATURE DETECTION METHOD

INCORPORATION BY REFERENCE

This application is based upon and claims the benefit of priority from the corresponding Japanese Patent Application No. 2016-091140 filed on Apr. 28, 2016, the entire contents of which are incorporated herein by reference.

BACKGROUND

The present disclosure relates to an electrophotographic type image forming apparatus, a temperature detection device provided in the image forming apparatus, and a temperature detection method.

An image forming apparatus, such as a printer, capable of forming an image by electrophotography includes a fixing device. The fixing device includes a fixing member such as a fixing roller for fixing a toner image on a sheet. In such a type of image forming apparatus, the temperature of the fixing member is detected, and drive of a heat source that heats the fixing member is controlled on the basis of the detected temperature of the fixing member. Here, an image forming apparatus that detects the temperature of a fixing member by using a thermocouple is known.

SUMMARY

A temperature detection device according to one aspect of the present disclosure includes: a thermocouple having a hot junction and a cold junction and configured to output a first signal value corresponding to a thermoelectromotive force generated between the hot junction and the cold junction; and a detection portion configured to detect a temperature of the cold junction and output a second signal value corresponding to the detected temperature, and detects a temperature of a fixing member used for fixing a toner image, by using a high-degree expression of the second degree or higher for temperature calculation that includes variables for which the first signal value and the second signal value are to be substituted. Specifically, any one or more of the first signal value, the second signal value, and a constant included in the high-degree expression include a decimal place. In addition, the temperature detection device includes a conversion processing portion and a calculation processing portion. The conversion processing portion is configured to multiply each of the first signal value, the second signal value, and the constant by a perfect power of 2 and convert each result of the multiplication to an integer that is approximate to the result of the multiplication. The calculation processing portion is configured to calculate the temperature of the fixing member by substituting the first signal value and the second signal value after the conversion by the conversion processing portion into a first transformation expression in which the constant in the high-degree expression is replaced by the constant after the conversion by the conversion processing portion, and multiplying or dividing each term included in the first transformation expression by a perfect power of 2.

An image forming apparatus according to another aspect of the present disclosure includes the temperature detection device and a fixing member. The fixing member is used for fixing a toner image.

A temperature detection method according to still another aspect of the present disclosure is executed by a temperature detection device including; a thermocouple having a hot junction and a cold junction and configured to output a first signal value corresponding to a thermoelectromotive force generated between the hot junction and the cold junction; and a detection portion configured to detect a temperature of the cold junction and output a second signal value corresponding to the detected temperature, the temperature detection device detecting a temperature of a fixing member used for fixing a toner image, by using a high-degree expression of the second degree or higher for temperature calculation that includes variables for which the first signal value and the second signal value are to be substituted. Specifically, any one or more of the first signal value, the second signal value, and a constant included in the high-degree expression include a decimal place. In addition, the temperature detection method includes the following first step and second step. In the first step, each of the first signal value, the second signal value, and the constant by a perfect power of 2 is multiplied, and each result of the multiplication is converted to an integer that is approximate to the result of the multiplication. In the second step, the temperature of the fixing member is calculated by substituting the first signal value and the second signal value after the conversion in the first step into a first transformation expression in which the constant in the high-degree expression is replaced by the constant after the conversion in the first step, and multiplying or dividing each term included in the first transformation expression by a perfect power of 2.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. It should be noted that the following embodiment is an example embodying the present disclosure and does not limit the technical scope of the present disclosure.

[Schematic Configuration of Image Forming Apparatus 10]

First, a schematic configuration of an image forming apparatus 10 according to the embodiment of the present disclosure will be described with reference to FIGS. 1 and 2. Here, FIG. 1 is a schematic cross-sectional view showing the configuration of the image forming apparatus 10.

The image forming apparatus 10 is a multifunction peripheral having a plurality of functions such as a scanning function to read image data from a document and a printing function to form an image on the basis of image data as well as a facsimile function, a copy function, and the like. The present disclosure is applicable to image forming apparatuses such as a printer apparatus, a facsimile apparatus, and a copy machine.

Figure 1:
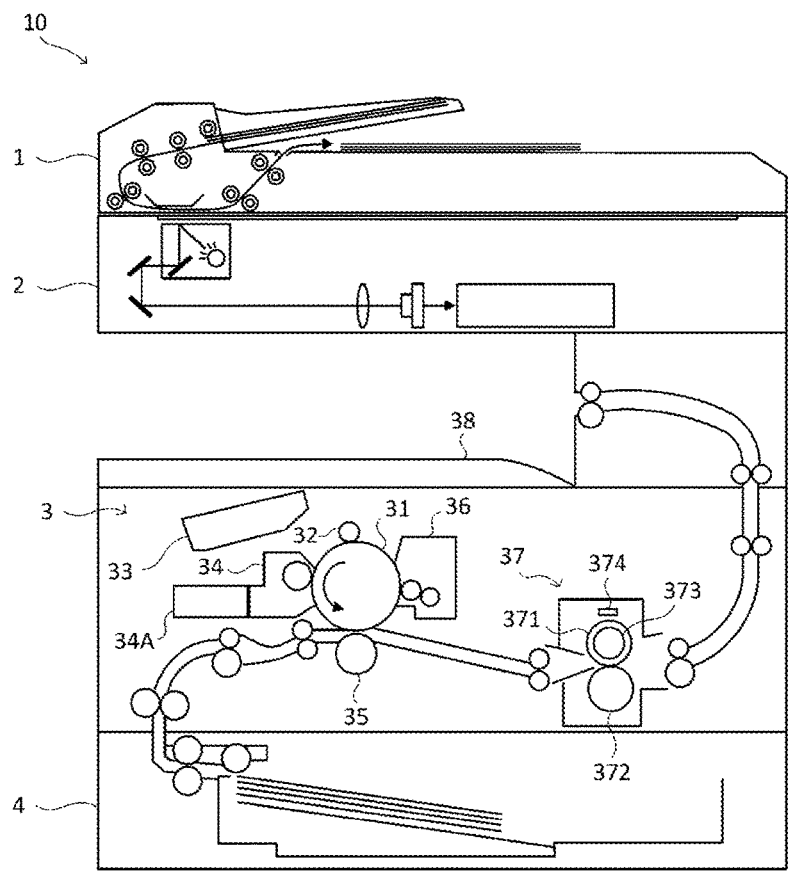
FIG. 1 is a diagram showing the configuration of an image forming apparatus according to an embodiment of the present disclosure.
Figure 2:
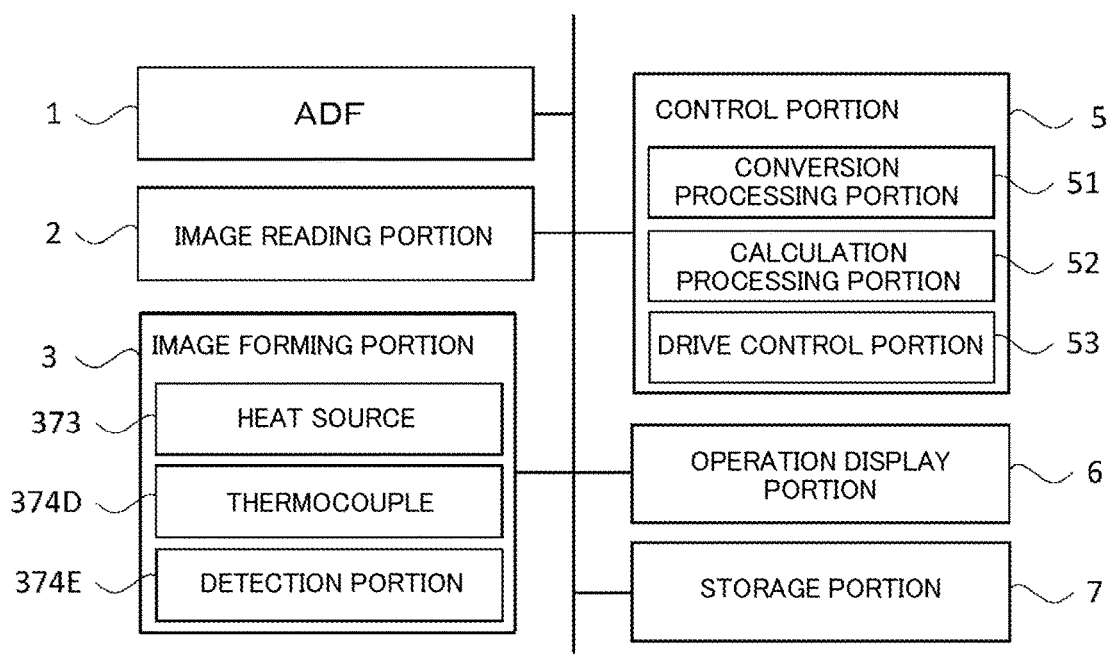
FIG. 2 is a block diagram showing the system configuration of the image forming apparatus according to the embodiment of the present disclosure.

As shown in FIGS. 1 and 2, the image forming apparatus 10 includes an automatic document feeder (ADF) 1, an image reading portion 2, an image forming portion 3, a sheet feed portion 4, a control portion 5, an operation display portion 6, and a storage portion 7.

The control portion 5 includes control devices such as a CPU, a ROM, a RAM, and an EEPROM that are not shown. The CPU is a processor that performs various calculation processes. The ROM is a non-volatile storage medium in which information such as control programs for causing the CPU to perform various processes is stored in advance. The RAM is a volatile storage medium, and the EEPROM is a non-volatile storage medium. The RAM and the EEPROM are used as temporary storage memories (working areas) for various processes performed by the CPU. In the control portion 5, various control programs stored in advance in the ROM are executed by the CPU. Accordingly, the image forming apparatus 10 is controlled centrally by the control portion 5. The control portion 5 may be composed of an electronic circuit such as an integrated circuit (ASIC), or may be a control portion provided independently of a main control portion that centrally controls the image forming apparatus 10.

The storage portion 7 is a non-volatile storage medium. For example, the storage portion 7 is a storage medium such as a flash memory, a solid state drive (SSD), or a hard disk drive (HDD).

The image forming portion 3 is capable of forming an image by electrophotography on the basis of image data read by the image reading portion 2 or image data inputted from an information processing apparatus such as an external personal computer. Specifically, as shown in FIG. 1, the image forming portion 3 includes a photosensitive drum 31, a charging device 32, a laser scanning unit 33, a developing device 34, a transfer roller 35, a cleaning device 36, a fixing device 37, and a sheet discharge tray 38.

In the image forming portion 3, an image is formed through the following procedure on a sheet fed from a sheet feed cassette that is detachably attached to the sheet feed portion 4, and the sheet on which the image has been formed is discharged to the sheet discharge tray 38. It should be noted that sheets stored in the sheet feed cassette include paper, coated paper, postcards, envelopes, OHP sheets, etc.

First, the surface of the photosensitive drum 31 is uniformly charged at a predetermined potential by the charging device 32. Next, light based on image data is applied to the surface of the photosensitive drum 31 by the laser scanning unit 33. Accordingly, an electrostatic latent image corresponding to the image data is formed on the surface of the photosensitive drum 31. Then, the electrostatic latent image on the photosensitive drum 31 is developed (visualized) as a toner image by the developing device 34. Toner (developer) is supplied from a toner container 34A, which is detachably attached to the image forming portion 3, to the developing device 34.

Subsequently, the toner image formed on the photosensitive drum 31 is transferred onto the sheet by the transfer roller 35. Thereafter, the toner image transferred onto the sheet is heated and pressed by the fixing device 37 to be melted and fixed on the sheet. The toner remaining on the surface of the photosensitive drum 31 is removed by the cleaning device 36.

Figures 3, 4, 5:
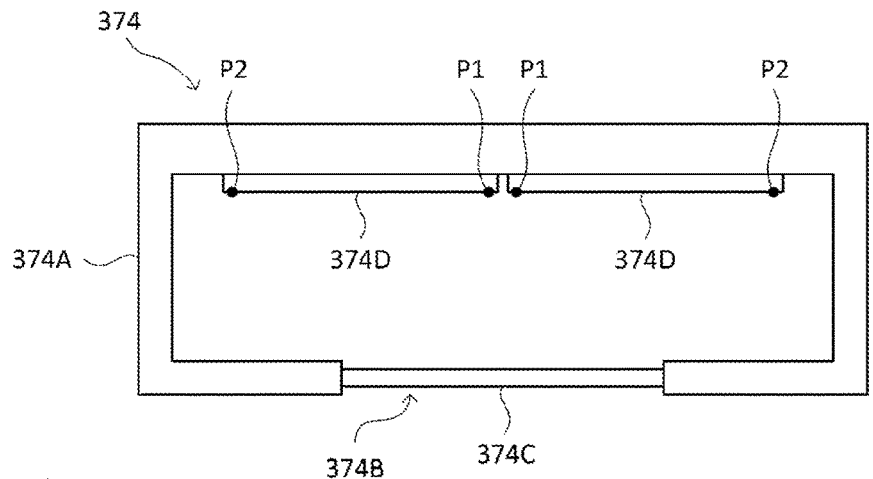
FIG. 3 is a diagram showing the configuration of a temperature sensor of the image forming apparatus according to the embodiment of the present disclosure.
FIG. 4 is a diagram showing an example of constants stored in a storage portion of the image forming apparatus according to the embodiment of the present disclosure.
FIG. 5 is a diagram showing an example of conversion of variables and constants used for temperature calculation in the image forming apparatus according to the embodiment of the present disclosure.

Here, the fixing device 37 will be described with reference to FIGS. 1 to 3. FIG. 3 is a schematic cross-sectional view of a temperature sensor 374.

As shown in FIG. 1, the fixing device 37 includes a fixing roller 371, a pressure roller 372, a heat source (heater) 373, and the temperature sensor 374.

The fixing roller 371 is a roller that rotates while being heated. In addition, the pressure roller 372 is a roller that rotates in contact with the fixing roller 371. For example, the fixing roller 371 and the pressure roller 372 are rubber rollers. For example, the pressure roller 372 is biased toward a direction opposing the fixing roller 371 by a biasing member that is not shown. Accordingly, a nip portion having a predetermined pressure is formed between the fixing roller 371 and the pressure roller 372.

The heat source 373 heats the fixing roller 371. For example, as shown in FIG. 1, the heat source 373 is provided within the fixing roller 371. For example, the heat source 373 is a halogen heater or an IH heater. The heat source 373 is driven by drive power supplied from a power supply circuit that is not shown, to heat the fixing roller 371.

In the image forming portion 3, the sheet onto which the toner image has been transferred by the transfer roller 35 is conveyed to the nip portion of the fixing device 37. Accordingly, the toner image transferred onto the sheet is heated and pressed by the fixing roller 371 and the pressure roller 372 to be melted and fixed on the sheet. Here, the fixing roller 371 is an example of a fixing member in the present disclosure.

The temperature sensor 374 is a sensor provided at a position away from the surface of the fixing roller 371 as shown in FIG. 1. The temperature sensor 374 detects the temperature of the surface of the fixing roller 371.

As shown in FIGS. 2 and 3, the temperature sensor 374 includes a casing 374A, an opening 374B, a light-transmitting portion 374C, thermocouples 374D, and a detection portion 374E.

The casing 374A houses the thermocouples 374D therein. As shown in FIG. 3, the casing 374A has the opening 374B. The temperature sensor 374 is disposed at such a position that the opening 374B opposes the surface of the fixing roller 371.

The light-transmitting portion 374C transmits infrared rays emitted from the surface of the fixing roller 371, into the casing 374A. As shown in FIG. 3, the light-transmitting portion 374C is provided in the opening 374B. For example, the light-transmitting portion 374C includes an optical filter and a condenser lens. The optical filter transmits light having predetermined wavelengths (infrared rays). The condenser lens condenses the infrared rays passing through the light-transmitting portion 374C, onto hot junctions P1 (see FIG. 3) of the thermocouples 374D provided within the casing 374A.

As shown in FIG. 3, a plurality of the thermocouples 374D are provided within the casing 374A. As shown in FIG. 3, each thermocouple 374D has the hot junction P1 and a cold junction P2. Each thermocouple 374D outputs a first signal value corresponding to a thermoelectromotive force generated between the hot junction P1 and the cold junction P2. Here, each hot junction P1 is disposed at a position to which the infrared rays transmitted through the light-transmitting portion 374C are applied. In addition, each cold junction P2 is disposed at a position to which the infrared rays transmitted through the light-transmitting portion 374C are not applied. Thus, each thermocouple 374D outputs the first signal value corresponding to the amount of the received infrared rays that are emitted from the surface of the fixing roller 371 and transmitted through the light-transmitting portion 374C. Specifically, each thermocouple 374D outputs the first signal value including a decimal place. For example, the first signal value is a voltage signal whose minimum is 0 V and whose maximum is 3.3 V. The number of the thermocouples 374D provided within the casing 374A may be any number.

The detection portion 374E detects the temperatures of the cold junctions P2 and outputs a second signal value corresponding to the detected temperatures. For example, the detection portion 374E is provided within the casing 374A. For example, the detection portion 374E is a thermistor. Specifically, the detection portion 374E outputs the second signal value including a decimal place. For example, similarly to the first signal value, the second signal value is a voltage signal whose minimum is 0 V and whose maximum is 3.3 V.

In the image forming apparatus 10, the temperature of the fixing roller 371 is detected on the basis of the first signal value outputted from each thermocouple 374D and the second signal value outputted from the detection portion 374E. Specifically, in the image forming apparatus 10, the temperature of the fixing roller 371 is detected by using a high-degree expression of the second degree or higher for temperature calculation that includes variables for which the first signal value and the second signal value are to be substituted. For example, the high-degree expression is an expression of the fifth degree or higher.

For example, the high-degree expression includes expression (1) and expression (2) shown below. In expression (1), T indicates the temperature (° C.) of the fixing roller 371. In addition, in expression (1), a, b, c, d, e, and f indicate constants. In expression (2), $V_{to}$ indicates the first signal value (V), and $V_{ta}$ indicates the second signal value (V). In addition, in expression (2), $\Delta V_{to}$ indicates a change amount (V) of the first signal value within a predetermined first time, and $\Delta V_{ta}$ indicates a change amount (V) of the second signal value within a predetermined second time. Moreover, in expression (2), g, h, i, and β indicate constants. For example, the first time is 200 milliseconds. The second time is 10 seconds.

$$T=aA^5+bA^4+cA^3+dA^2+eA+f \quad (1)$$

$$A=V_{to}+(g\times\Delta V_{to})+(h\times\Delta V_{ta})+(i\times(V_{ta}-\beta)) \quad (2)$$

In the image forming apparatus 10, the values of the constants a, b, c, d, e, f, g, h, i, and β included in expression (1) and expression (2) are stored in the storage portion 7. FIG. 4 shows an example of the constants a, b, c, d, e, f, g, h, i, and β stored in the storage portion 7. As shown in FIG. 4, the constants a, b, c, f, g, i, and β are values each including a decimal place. The values of the constants a, b, c, d, e, f, g, h, i, and β may be stored in the ROM or the EEPROM of the control portion 5.

Meanwhile, when each of the first signal value $V_{to}$ outputted from each thermocouple 374D, the second signal value $V_{ta}$ outputted from the detection portion 374E, and the constants included in expression (1) and expression (2) includes a decimal place, the processing load of the control portion 5 that performs a calculation process of values each including a decimal place increases, so that a speed at which another process is performed by the control portion 5 may decrease. On the other hand, when each of the first signal value $V_{to}$, the second signal value $V_{ta}$, and the constants included in expression (1) and expression (2) is multiplied by a perfect power of 10 and the value thereof is converted in advance to an integer in order to eliminate the decimal place, division for which the processing load of the control portion 5 is high needs to be performed in a calculation process.

In contrast, in the image forming apparatus 10 according to the embodiment of the present disclosure, the processing load of the control portion 5, which detects the temperature of the fixing roller 371 by using the thermocouples 374D, can be reduced as described below.

Specifically, a drive control program for causing the CPU to perform a later-described drive control process (see a flowchart in FIG. 6) and a later-described temperature calculation process (see a flowchart in FIG. 7) is stored in advance in the ROM of the control portion 5. The drive control program may be stored in a non-transitory computer-readable storage medium such as a CD, a DVD, or a flash memory, and may be read from the storage medium and installed into the storage portion 7.

As shown in FIG. 2, the control portion 5 includes a conversion processing portion 51, a calculation processing portion 52, and a drive control portion 53. Specifically, the control portion 5 executes the drive control program stored in the ROM, by using the CPU. Accordingly, the control portion 5 functions as the conversion processing portion 51, the calculation processing portion 52, and the drive control portion 53. Here, a device including the temperature sensor 374 and the control portion 5 is an example of a temperature detection device in the present disclosure.

The conversion processing portion 51 multiplies each of the first signal value $V_{to}$, the second signal value $V_{ta}$, and the constants included in expression (1) and expression (2) by a perfect power of 2, and converts each result of the multiplication to an integer that is approximate to the result of the multiplication.

For example, the conversion processing portion 51 acquires the first signal value $V_{to}$ and the second signal value $V_{ta}$ from each thermocouple 374D and the detection portion 374E every predetermined detection interval. For example, the acquisition interval is 100 milliseconds.

Then, the conversion processing portion 51 multiplies the acquired first signal value $V_{to}$ by $2^{10}$ (=1024) and drops the fractional portion of the result of the multiplication, thereby converting the first signal value $V_{to}$ to an integer. In addition, the conversion processing portion 51 multiplies the acquired second signal value $V_{ta}$ by $2^{10}$ (=1024) and drops the fractional portion of the result of the multiplication, thereby converting the second signal value $V_{ta}$ to an integer. The conversion processing portion 51 may convert each of the first signal value $V_{to}$ and the second signal value $V_{ta}$ by rounding up the fractional portion of the result of the multiplication or rounding off the result of the multiplication to the nearest integer.

Moreover, when a predetermined control start condition is satisfied, the conversion processing portion 51 acquires the constants a, b, c, d, e, f, g, h, i, and β included in expression (1) and expression (2), from the storage portion 7. Examples of the control start condition include: the power to the image forming apparatus 10 being turned on; and the operation mode of the image forming apparatus 10 being shifted from a sleep mode to a normal mode.

Then, the conversion processing portion 51 multiplies each of the constants a and β of the acquired constants by $2^{10}$ (=1024) and drops the fractional portion of the result of the multiplication, thereby converting each of the constants a and β to an integer. In addition, the conversion processing portion 51 multiplies each of the constants b, c, d, e, f, g, h, and i of the acquired constants by $2^7$ (=128) and drops the fractional portion of the result of the multiplication, thereby converting each of the constants b, c, d, e, f, g, h, and i to an integer.

FIG. 5 shows an example of conversion of the first signal value $V_{to}$, the second signal value $V_{ta}$, and the constants included in expression (1) and expression (2) by the conversion processing portion 51. Hereinafter, the first signal value $V_{to}$, the second signal value $V_{ta}$, and the constants a, b, c, d, e, f, g, h, i, and β after the conversion by the conversion processing portion 51 are referred to as conversion values $V_{to}'$, $V_{ta}'$, a', b', c', d', e', f', g', h', i' and β', respectively.

The calculation processing portion 52 detects the temperature of the fixing roller 371 by using expression (1) and expression (2). For example, the calculation processing portion 52 detects the temperature of the fixing roller 371 every detection interval described above.

For example, the calculation processing portion 52 can calculate the temperature of the fixing roller 371 by: substituting the first signal value $V_{to}$ and the second signal value $V_{ta}$ after the conversion by the conversion processing portion 51, into a first transformation expression in which the constants included in expression (1) and expression (2) are replaced by the constants after the conversion by the conversion processing portion 51; and multiplying or dividing each term included in the first transformation expression by a perfect power of 2.

Specifically, the first transformation expression is represented by the following expression (3) and expression (4).

$$a'B^5+b'B^4+c'B^3+d'B^2+e'B+f' \quad (3)$$

$$B=V_{to}'+(g'\times\Delta V_{to}')+(h'\times\Delta V_{ta}')+(i'\times(V_{ta}'-\beta')) \quad (4)$$

Here, by multiplying or dividing each term included in expression (4) by a perfect power of 2 as shown in the following expression (5), it is possible to calculate a value B' (B'=$2^{12}$ A) that is obtained by multiplying A calculated by expression (2), by a perfect power of 2.

$$B'=2^2V_{to}'+2^{-5}(g'\times\Delta V_{to}')+2^{-5}(h'\times\Delta V_{ta}')+2^{-5}(i'\times(V_{ta}'-\beta')) \quad (5)$$

In addition, by replacing B included in expression (3) by B' calculated by expression (5) and dividing each term by a perfect power of 2 as shown in the following expression (6), it is possible to calculate the temperature T of the fixing roller 371.

$$T=2^{-70}a'(B')^5+2^{-55}b'(B')^4+2^{-43}c'(B')^3+2^{-31}d'(B')^2+2^{-19}e'B'+2^{-7}f' \quad (6)$$

Meanwhile, the calculation processing portion 52 also can calculate the temperature of the fixing roller 371 by: substituting the first signal value $V_{to}$ and the second signal value $V_{ta}$ after the conversion by the conversion processing portion 51, into a second transformation expression obtained by factorizing the first transformation expression; performing a calculation process in order from the expression of a lower degree included in the second transformation expression; and multiplying or dividing each term included in the second transformation expression by a perfect power of 2.

Specifically, expression (7) shown below is obtained by factorizing expression (3).

$$B(B(B(B(Ba'+b')+c')+d')+e')+f' \quad (7)$$

Here, by replacing B included in expression (7) by B' calculated by expression (5) and multiplying or dividing each term by a perfect power of 2 as shown in the following expression (8), it is possible to calculate the temperature T of the fixing roller 371.

$$T=2^{-19}(2^{-12}B'(2^{-12}B'(2^{-12}B'(2^{-12}B'(2^{-3}B'a'+2^{12}b')+2^{12}c')+2^{12}d')+2^{12}e')+2^{12}f') \quad (8)$$

Specifically, the calculation processing portion 52 can calculate the temperature T of the fixing roller 371 by sequentially calculating linear expression (9), quadratic expression (10), cubic expression (11), quartic expression (12), and quintic expression (13) included in expression (8), and dividing the result of the calculation of quintic expression (13) by $2^{19}$.

$$(2^{-3}B'a'+2^{12}b') \quad (9)$$

$$(2^{-12}B'(2^{-3}B'a'+2^{12}b')+2^{12}c') \quad (10)$$

$$(2^{-12}B'(2^{-12}B'(2^{-3}B'a'+2^{12}b')+2^{12}c')+2^{12}d') \quad (11)$$

$$(2^{-12}B'(2^{-12}B'(2^{-12}B'(2^{-3}B'a'+2^{12}b')+2^{12}c')+2^{12}d')+2^{12}e') \quad (12)$$

$$(2^{-12}B'(2^{-12}B'(2^{-12}B'(2^{-12}B'(2^{-3}B'a'+2^{12}b')+2^{12}c')+2^{12}d')+2^{12}e')+2^{12}f') \quad (13)$$

In the image forming apparatus 10, the calculation processing portion 52 calculates the temperature T of the fixing roller 371 by using expression (8). Accordingly, it is possible to reduce the number of digits of each value obtained in the calculation process, as compared to the case where expression (6) is used for calculating the temperature T of the fixing roller 371. That is, even when the number of digits in which calculation is possible by the calculation processing portion 52 is small, it is possible to calculate the temperature T of the fixing roller 371.

A multiplier in multiplication of a perfect power of 2 with respect to each of the first signal value $V_{to}$, the second signal value $V_{ta}$, and the constants included in expression (1) and expression (2) by the conversion processing portion 51 may be set to an arbitrary value in consideration of the number of digits in which calculation is possible by the calculation processing portion 52, the number of significant figures in the calculation process, etc. Similarly, a multiplier and a divisor in multiplication and division of a perfect power of 2 with respect to each term in expression (5) and expression (8) by the calculation processing portion 52 may also be set to arbitrary values in consideration of the number of digits in which calculation is possible by the calculation processing portion 52, the number of significant figures in the calculation process, etc. In addition, the calculation processing portion 52 may calculate the temperature T of the fixing roller 371 by using expression (6).

For example, the calculation processing portion 52 calculates the temperature T of the fixing roller 371 by dropping the fractional portion of a value calculated by using expression (8).

The drive control portion 53 controls drive of the heat source 373 on the basis of the temperature T of the fixing roller 371 calculated by the calculation processing portion 52. For example, the drive control portion 53 controls drive of the heat source 373 such that the temperature T of the fixing roller 371 becomes equal to a predetermined reference temperature. For example, the reference temperature is 200° C. Specifically, the drive control portion 53 controls drive of the heat source 373 by adjusting the drive power supplied from the power supply circuit to the heat source 373.

[Drive Control Process]

Figure 6:
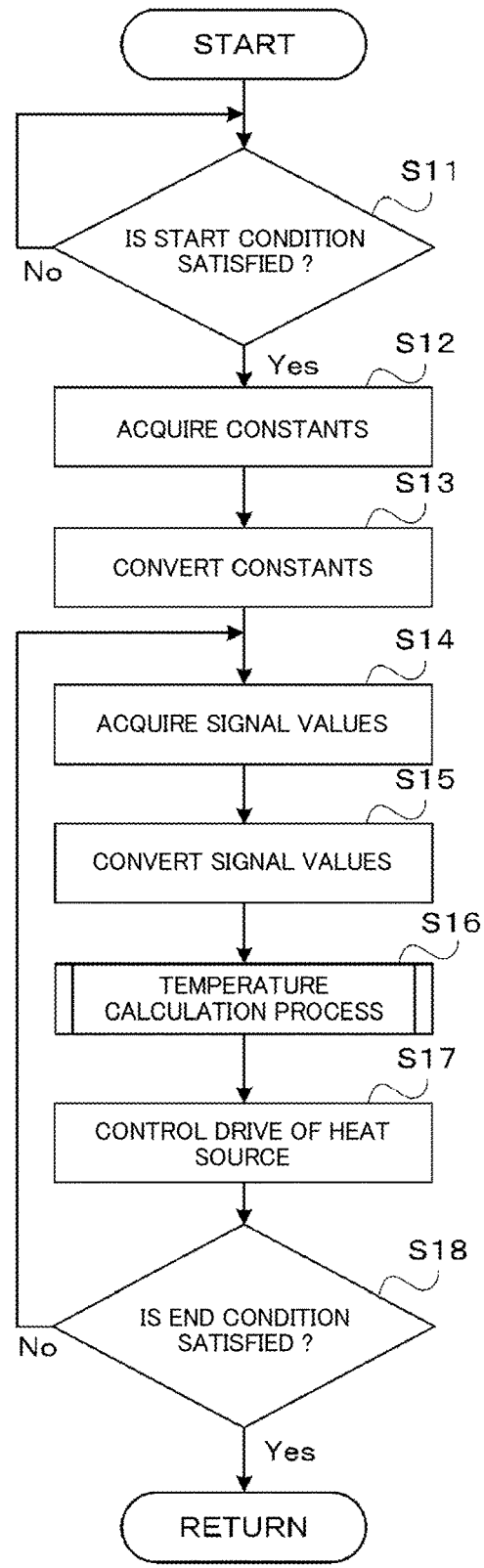
FIG. 6 is a flowchart showing an example of a drive control process performed in the image forming apparatus according to the embodiment of the present disclosure.

Hereinafter, with reference to FIG. 6, an example of the procedure of a temperature detection method according to the present disclosure will be described with an example of the procedure of the drive control process performed by the control portion 5 in the image forming apparatus 10. Here, S11, S12 . . . represent numbers of process procedures (steps) executed by the control portion 5.

<Step S11>

First, in step S11, the control portion 5 determines whether the control start condition is satisfied.

Here, if the control portion 5 determines that the control start condition is satisfied (Yes in S11), the control portion 5 shifts the process to step S12. In addition, if the control start condition is not satisfied (No in S11), the control portion 5 waits for satisfaction of the control start condition in step S11.

<Step S12>

In step S12, the control portion 5 acquires the constants a, b, c, d, e, f, g, h, and β included in expression (1) and expression (2), from the storage portion 7.

<Step S13>

In step S13, the control portion 5 converts the constants acquired in step S12 to integers.

Specifically, the control portion 5 multiplies the constants a and β of the constants acquired in step S12 by $2^{10}$ (=1024) and drops the fractional portions of the results of the multiplication, thereby converting the constants a and β to the conversion values a' and β'. In addition, the control portion 5 multiplies the constants b, c, d, e, f, g, h, and i of the constants acquired in step S12 by $2^7$ (=128) and drops the fractional portions of the results of the multiplication, thereby converting the constants b, c, d, e, f, g, h, and i to the conversion values b', c', d', e', f', g', h', and i'.

<Step S14>

In step S14, the control portion 5 acquires the first signal value $V_{to}$ and the second signal value $V_{ta}$ from each thermocouple 374D and the detection portion 374E.

<Step S15>

In step S15, the control portion 5 converts the first signal value $V_{to}$ and the second signal value $V_{ta}$ acquired in step S14 to integers. Here, the processes in steps S12 to S15 are an example of a first step in the present disclosure and are performed by the conversion processing portion 51 of the control portion 5.

Specifically, the control portion 5 multiplies the first signal value $V_{to}$ acquired in step S14 by $2^{10}$ (=1024) and drops the fractional portion of the result of the multiplication, thereby converting the first signal value $V_{to}$ to the conversion value $V_{to}'$. In addition, the control portion 5 multiplies the second signal value $V_{ta}$ acquired in step S14 by $2^{10}$ (=1024) and drops the fractional portion of the result of the multiplication, thereby converting the second signal value $V_{ta}$ to the conversion value $V_{ta}'$.

<Step S16>

In step S16, the control portion 5 performs the temperature calculation process described below. Here, the process in step S16 is a second step in the present disclosure and is performed by the calculation processing portion 52 of the control portion 5.

[Temperature Calculation Process]

Figure 7:
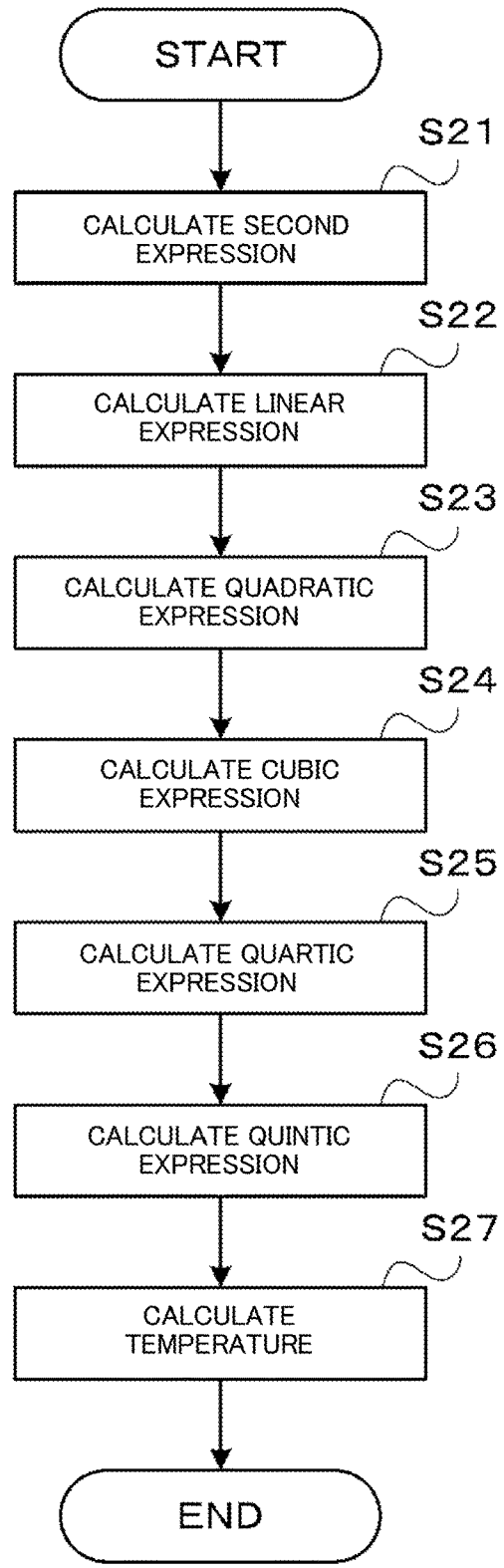
FIG. 7 is a flowchart showing an example of a temperature calculation process performed in the image forming apparatus according to the embodiment of the present disclosure.

Here, an example of the procedure of the temperature calculation process performed in step S16 of the drive control process will be described with reference to FIG. 7. The description of processes in step S17 and the subsequent step of the drive control process will be given after end of the description of the temperature calculation process. In addition, in the following, the description will be given on the assumption that $\Delta V_{to}$ and $\Delta V_{ta}$ are 0.

<Step S21>

First, in step S21, the control portion 5 calculates the value of B' according to expression (5). For example, the control portion 5 calculates the value of B' by substituting the conversion values $V_{to}'$ and $V_{ta}'$ shown in FIG. 5 into expression (5) including the constants h', i', and β' shown in FIG. 5. For example, the value of B' calculated by the control portion 5 is 4,930.

Here, expression (5) includes division of $2^5$. However, the division of $2^5$ can be handled by bit operation. Therefore, each of the first signal value $V_{to}$, the second signal value $V_{ta}$, and the constants included in expression (1) and expression (2) is multiplied by a perfect power of 10, so that the processing load of the control portion 5 is reduced as compared to the case where division of a perfect power of 10 is performed in a subsequent calculation process.

<Step S22>

In step S22, the control portion 5 calculates linear expression (9). For example, the control portion 5 substitutes the value of B' calculated in step S21 into linear expression (9) including the constants a' and b' shown in FIG. 5, to calculate a value of −486,356,137.

Here, linear expression (9) includes division of $2^3$. However, the division of $2^3$ can be handled by bit operation.

<Step S23>

In step S23, the control portion 5 calculates quadratic expression (10). For example, the control portion 5 substitutes the value of B' calculated in step S21 and the result of the calculation in step S22 into quadratic expression (10) including the constants a', b', and c' shown in FIG. 5, to calculate a value of 1,631,513,855.

Here, quadratic expression (10) includes division of $2^{12}$. However, the division of $2^{12}$ can be handled by bit operation. The control portion 5 performs the division of $2^{12}$ on the result of the calculation in step S22, and then multiplies the resultant value by the value of B' calculated in step S21. Accordingly, the number of digits of the value obtained in the calculation process is reduced as compared to the case where the calculation is performed in the reversed order.

<Step S24>

In step S24, the control portion 5 calculates cubic expression (11). For example, the control portion 5 substitutes the value of B' calculated in step S21 and the result of the calculation in step S23 into cubic expression (11) including the constants a', b', c', and d' shown in FIG. 5, to calculate a value of −2,498,503,424.

Here, cubic expression (11) includes division of $2^{12}$. However, the division of $2^{12}$ can be handled by bit operation. The control portion 5 performs the division of $2^{12}$ on the result of the calculation in step S23, and then multiplies the resultant value by the value of B' calculated in step S21.

<Step S25>

In step S25, the control portion 5 calculates quartic expression (12). For example, the control portion 5 substitutes the value of B' calculated in step S21 and the result of the calculation in step S24 into quartic expression (12) including the constants a', b', c', d', and e' shown in FIG. 5, to calculate a value of 1,601,783,904.

Here, quartic expression (12) includes division of $2^{12}$. However, the division of $2^{12}$ can be handled by bit operation. The control portion 5 performs the division of $2^{12}$ on the result of the calculation in step S24, and then multiplies the resultant value by the value of B' calculated in step S21.

<Step S26>

In step S26, the control portion 5 calculates quintic expression (13). For example, the control portion 5 substitutes the value of B' calculated in step S21 and the result of the calculation in step S25 into quintic expression (13) including the constants a', b', c', d', e', and f' shown in FIG. 5, to calculate a value of 21,191,228.

Here, quintic expression (13) includes division of $2^{12}$. However, the division of $2^{12}$ can be handled by bit operation. The control portion 5 performs the division of $2^{12}$ on the result of the calculation in step S25, and then multiplies the resultant value by the value of B' calculated in step S21.

<Step S27>

In step S27, the control portion 5 calculates the temperature T of the fixing roller 371. For example, the control portion 5 performs division of $2^{19}$ on the result of the calculation in step S26 and drops the fractional portion of the result of the division, thereby calculating 40 (° C.) as the temperature T of the fixing roller 371.

This is the end of the description of the temperature calculation process, and the description of the processes in step S17 and the subsequent step of the drive control process is started.

<Step S17>

In step S17, the control portion 5 controls drive of the heat source 373 on the basis of the temperature T of the fixing roller 371 calculated in step S16 such that the temperature T of the fixing roller 371 becomes equal to the reference temperature. Specifically, the control portion 5 controls drive of the heat source 373 by adjusting the drive power supplied from the power supply circuit to the heat source 373. Here, the process in step S17 is performed by the drive control portion 53 of the control portion 5.

<Step S18>

In step S18, the control portion 5 determines whether a predetermined control end condition is satisfied. Examples of the control end condition include: the power to the image forming apparatus 10 being cut off, and the operation mode of the image forming apparatus 10 being shifted from the normal mode to the sleep mode.

Here, if the control portion 5 determines that the control end condition is satisfied (Yes in S18), the control portion 5 shifts the process to step S11. In addition, if the control end condition is not satisfied (No in S18), the control portion 5 shifts the process to step S14 at the time at which a time corresponding to the detection interval elapses from the time at which the process in step S14 is performed. Accordingly, until the control end condition becomes satisfied, the temperature of the fixing roller 371 is maintained at the reference temperature.

As described above, in the image forming apparatus 10, the first signal value $V_{to}$ outputted from each thermocouple 374D, the second signal value $V_{ta}$ outputted from the detection portion 374E, and the constants included in expression (1) and expression (2) are multiplied by a perfect power of 2, and each of the results of the multiplication is converted to an integer that is approximate to the result of the multiplication. Then, the first signal value $V_{to}$ and the second signal value $V_{ta}$ after the conversion are substituted into the transformation expressions of expression (1) and expression (2) including the constants after the conversion, and each term included in the transformation expressions is multiplied or divided by a perfect power of 2, whereby the temperature T of the fixing roller 371 is calculated. Accordingly, it is possible to eliminate calculation including a decimal point in the calculation process for the temperature T of the fixing roller 371. In addition, division occurring in the calculation process for the temperature T as a result of the process of converting the first signal value $V_{to}$, the second signal value $V_{ta}$, and the constants to the integers is division of a perfect power of 2, and thus the division can be handled by using bit operation. Therefore, it is possible to reduce the processing load of the control portion 5, which detects the temperature T of the fixing roller 371 by using the thermocouples 374D.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A temperature detection device comprising:
a thermocouple having a hot junction and a cold junction and configured to output a first signal value corresponding to a thermoelectromotive force generated between the hot junction and the cold junction; and
a detection portion configured to detect a temperature of the cold junction and output a second signal value corresponding to the detected temperature, the temperature detection device detecting a temperature of a fixing member used for fixing a toner image, by using a high-degree expression of the second degree or higher for temperature calculation that includes variables for which the first signal value and the second signal value are to be substituted, wherein
any one or more of the first signal value, the second signal value, and a constant included in the high-degree expression include a decimal place, and
the temperature detection device further comprises:
a conversion processing portion configured to multiply each of the first signal value, the second signal value, and the constant by a perfect power of 2 and convert each result of the multiplication to an integer that is approximate to the result of the multiplication; and
a calculation processing portion configured to calculate the temperature of the fixing member by substituting the first signal value and the second signal value after the conversion by the conversion processing portion into a first transformation expression in which the constant in the high-degree expression is replaced by the constant after the conversion by the conversion processing portion, and multiplying or dividing each term included in the first transformation expression by a perfect power of 2.

2. The temperature detection device according to claim 1, wherein the calculation processing portion calculates the temperature of the fixing member by: substituting the first signal value and the second signal value after the conversion by the conversion processing portion into a second transformation expression obtained by factorizing the first transformation expression; performing a calculation process in order from an expression of a lower degree included in the second transformation expression; and multiplying or dividing each term included in the second transformation expression by a perfect power of 2.

3. The temperature detection device according to claim 1, wherein the high-degree expression is an expression of the fifth degree or higher.

4. An image forming apparatus comprising the temperature detection device according to claim 1 and the fixing member.

5. A temperature detection method executed by a temperature detection device including: a thermocouple having a hot junction and a cold junction and configured to output a first signal value corresponding to a thermoelectromotive force generated between the hot junction and the cold junction; and a detection portion configured to detect a temperature of the cold junction and output a second signal value corresponding to the detected temperature, the temperature detection device detecting a temperature of a fixing member used for fixing a toner image, by using a high-degree expression of the second degree or higher for temperature calculation that includes variables for which the first signal value and the second signal value are to be substituted, wherein any one or more of the first signal value, the second signal value, and a constant included in the high-degree expression include a decimal place, and the temperature detection method comprises:

a first step of multiplying each of the first signal value, the second signal value, and the constant by a perfect power of 2 and converting each result of the multiplication to an integer that is approximate to the result of the multiplication; and a second step of calculating the temperature of the fixing member by substituting the first signal value and the second signal value after the conversion in the first step into a first transformation expression in which the constant in the high-degree expression is replaced by the constant after the conversion in the first step, and multiplying or dividing each term included in the first transformation expression by a perfect power of 2.

* * * * *